United States Patent [19]
Arai

[11] Patent Number: 5,553,481
[45] Date of Patent: Sep. 10, 1996

[54] PRESSURE DETECTING APPARATUS OF INJECTION MOLDING MACHINE

[75] Inventor: Tyuyoshi Arai, Nagano, Japan

[73] Assignee: Nissei Plastic Industrial Co., Ltd., Nagano-ken, Japan

[21] Appl. No.: 392,513

[22] Filed: Feb. 23, 1995

[30] Foreign Application Priority Data

Mar. 4, 1994 [JP] Japan .................................. 6-060300

[51] Int. Cl.$^6$ .................................................. G01L 27/00
[52] U.S. Cl. ...................... 73/4 R; 364/555; 364/571.05; 425/170
[58] Field of Search .............................. 73/4 R; 364/558, 364/571.02, 571.03, 571.04, 571.05, 571.06; 425/169, 170

[56] References Cited

U.S. PATENT DOCUMENTS

| | | | |
|---|---|---|---|
| 4,542,638 | 9/1985 | Tlaker | 73/4 R X |
| 4,598,381 | 7/1986 | Cucci | 73/708 X |
| 4,781,080 | 11/1988 | Iwatsuki | 477/161 |
| 4,851,171 | 7/1989 | Shimizu et al. | 264/40.5 |
| 4,862,393 | 8/1989 | Reid et al. | 364/550 |
| 5,001,640 | 3/1991 | Matsumoto et al. | 364/426.02 |
| 5,209,108 | 5/1993 | Shackelford | 73/54.28 |
| 5,311,452 | 5/1994 | Yokota et al. | 73/4 R X |
| 5,457,631 | 10/1995 | Momose | 73/4 R X |

FOREIGN PATENT DOCUMENTS 1-263021  10/1989  Japan .

OTHER PUBLICATIONS

*Patent Abstracts of Japan* Grp M1566, vol. 18, No. 115; Abs Pub. date Feb. 24, 1994 (5–309712) "Dwell Controlling Device of Injection Molding Machine".

*Patent Abstracts of Japan* Grp M1461, vol. 17, No. 433 Abs Pub. date Aug. 11, 1993 (5–96592) "Controller of Injection Molding Machine".

*Primary Examiner*—Thomas P. Noland
*Attorney, Agent, or Firm*—Birch, Stewart, Kolasch & Birch, LLP

[57] ABSTRACT

A pressure detecting apparatus of an injection molding machine is utilized for always keeping an accurate zero adjustment point and accurately and precisely detecting pressure without being influenced by temperature drift. The pressure detecting apparatus includes pressure sensors for detecting the oil pressures of hydraulic cylinders such as injection cylinders. Correction value computing sections are provided for obtaining detected pressure values according to the outputs of the pressure sensors in a period in which the oil pressures theoretically become zero as correction values. Correction value storing sections are provided for storing the obtained correction values. Pressure correcting sections are provided for correcting the detected pressure values by the correction values according to the outputs of the pressure sensors at a time of pressure detection.

5 Claims, 4 Drawing Sheets

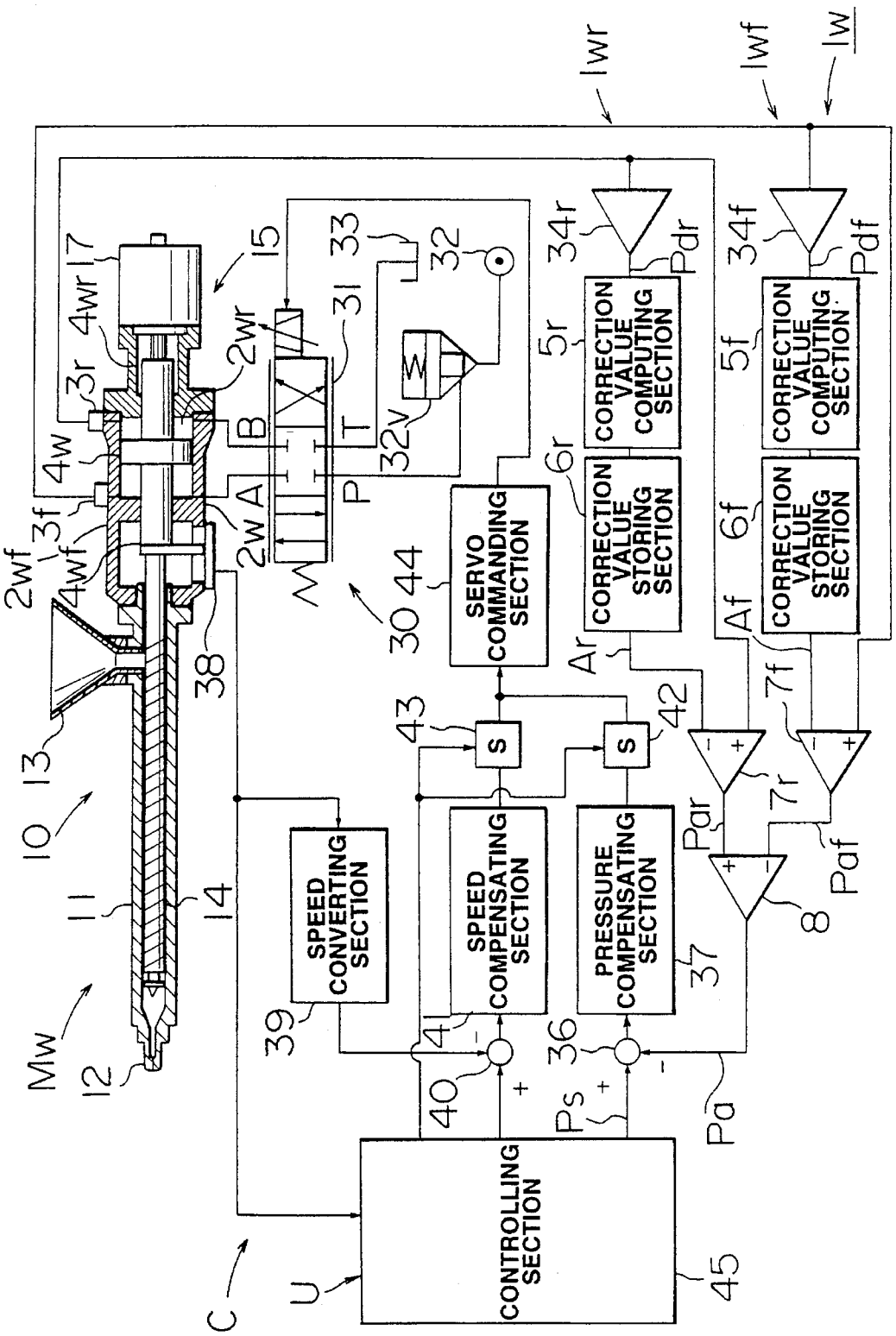

PRESSURE DETECTING APPARATUS OF INJECTION MOLDING MACHINE

BACKGROUND OF THE INVENTION

1. Field of the Invention

The present invention relates to a pressure detecting apparatus of an injection molding machine, for detecting the pressure of a hydraulic cylinder such as an injection cylinder.

2. Description of the Related Art

The injection molding machine disclosed in the official gazette of Japanese Patent Laid-Open No. 1(1989)-263021 is generally known as an existing injection molding machine provided with a pressure detecting apparatus. The injection molding machine has an injection nozzle at its front end, a barrel cylinder into which a screw is inserted, and a pair of injection cylinders (hydraulic cylinders) having a built-in piston. Moreover, a rod protruding backward from the piston is connected with the rear end of the screw so that they can move forward or backward together.

The injection molding machine is also provided with a controller having a pressure detecting apparatus. The pressure detecting apparatus comprises a pressure sensor (hydraulic sensor) to detect the oil pressure of a rear oil chamber and an amplifier connected to the pressure sensor. Thereby, a detection signal of the pressure sensor is amplified by the amplifier to serve as a detected pressure value at the time of pressure control. The detected pressure value is compared with a set pressure value by a comparator and thereby the deviation between the detected pressure value and the set pressure value is obtained. The deviation is pressure-compensated by a pressure compensating section and moreover amplified by the amplifier, and thereafter outputted to a servo valve drive. A command signal is outputted from the servo valve drive to a servo valve, pressure-controlled oil is supplied to the injection cylinder, and pressure feedback control is performed so as to make the detected pressure value equal to the set pressure value.

Because the above existing pressure detecting apparatus frequently uses a strain gauge as a pressure sensor, the obtained detected pressure value includes errors due to the fluctuation of characteristics of the strain gauge and the fluctuation caused when setting the strain gauge to the injection cylinder. Therefore, a zero adjusting circuit and a gain adjusting circuit are normally built in the amplifier connected to the pressure sensor to perform zero adjustment and gain adjustment at the time of initial adjustment.

However, when temperature drift occurs due to various factors including an operating environment and an operating time zone of the injection molding machine, even if zero adjustment is performed at the time of initial adjustment, problems occur such that the adjustment point is deviated from the normal zero adjustment point and as a result, pressure is not accurately or precisely detected, involving deterioration of the quality of a molded part.

SUMMARY OF THE INVENTION

It is an object of the present invention to provide a pressure detecting apparatus of an injection molding machine, making it possible to always keep an accurate zero adjustment point and accurately and precisely detect pressure without being influenced by temperature drift and further to improve the quality of a molded part.

To achieve the object, the present invention uses pressure detecting apparatuses 1 and 1w of an injection molding machine, comprising pressure sensors 3, 3f, and 3r for detecting the oil pressure of hydraulic cylinders such as injection cylinders 2 and 2w, wherein the following are included: correction value computing sections 5, 5f, and 5r for obtaining detected pressure values Pd, Pdf, and Pdr according to the outputs from the pressure sensors 3, 3f, and 3r in a period Ts in which the oil pressure theoretically becomes zero as correction values A, Af, and Ar; correction value storing sections 6, 6f, and 6r for storing the obtained correction values A, Af, and Ar; and pressure correcting sections 7, 7f, and 7r for correcting the detected pressure values Pd, Pdf, and Pdr according to the outputs from the pressure sensors 3, 3f, and 3r at the time of pressure detection by the correction values A, Af, and Ar.

In this case, it is possible to set the period Ts in which the oil pressure theoretically becomes zero to a predetermined period after initialization due to power supply is completed or a predetermined period after an injection process is completed. It is preferable to obtain the correction values A, Af, and Ar by averaging the detected pressure values Pd . . . , Pdf . . . , and Pdr . . . obtained by sampling the correction values A, Af, and Ar several times. A constitution can be obtained by using an injection cylinder 2 having a built-in single-rod piston 4 and a pressure sensor 3 for detecting the oil pressure of a rear oil chamber 2r of the injection cylinder 2. Meanwhile, another constitution can be obtained by using an injection cylinder 2w having a built-in double-rod piston 4w and a pair of pressure sensors 3f and 3r for detecting the oil pressure of a front oil chamber 2wf and a rear oil chamber 2wr of the injection cylinder 2w. In this case, when an injection cylinder 2w having a built-in double-rod piston 4w is used, a difference computing section 8 is used which obtains a detected pressure value Pa of the piston 4w from the difference between the corrected detected pressure values Pdf and Pdr according to the outputs of the pressure sensor 3f and 3r.

Thereby, basically, the oil pressures of the injection cylinders 2 and 2w are detected by the pressure sensors 3, 3f, and 3r and the intended detected pressure values Pd, Pdf, and Pdr are obtained in accordance with the outputs from the pressure sensors 3, 3f, and 3r.

While the injection molding machine operates, there is a period Ts in which the oil pressure theoretically becomes zero. For example, a predetermined period after initialization due to power supply is completed or a predetermined period after the injection process is completed is the period Ts in which the detected pressure values Pd, Pdf, and Pdr become zero because pressure is not controlled during that period. The present invention pays attention to the period Ts to automatically correct the detected pressure values Pd, Pdf, and Pdr by the correction values A, Af, and Ar obtained in this period Ts at the time of pressure detection.

That is, because the detected pressure values Pd, Pdf, and Pdr in the period Ts are errors in the period Ts in which they theoretically (originally) become zero, the then detected pressure values Pd, Pdf, and Pdr are previously obtained by the correction value computing sections 5, 5f, and 5r as the correction values A, Af, and Ar. When obtaining the correction values A, Af, and Ar, errors of the correction values A, Af, and Ar are decreased by averaging the detected pressure values Pd . . . , Pdf . . . , and Pdr . . . obtained by sampling them several times. Then, the obtained correction values A, Af, and Ar are stored in correction value storing sections 6, 6f, and 6r.

On the other hand, at the time of pressure detection when pressure is controlled, etc., the detected pressure values pd, Pdf, and Pdr according to the outputs from the pressure sensors 3, 3f, and 3r at the time of the pressure detection are corrected by the correction values A, Af, and Ar stored in the correction value storing sections 6, 6f, and 6r. That is, the correction values A, Af, and Ar are added to or subtracted from the detected pressure values Pd, Pdf, and Pdr and as a result, accurately-corrected detected pressure values Pa, Paf, and Par are obtained. Incidentally, when the injection cylinder 2w having a built-in double-rod piston 4 is used, the detected pressure value Pa (injection pressure or dwell pressure, etc.) of the piston 4w is obtained from the difference between the detected pressure values Paf and Par corrected in accordance with the outputs from the pressure sensors 3f and 3r by the difference computing section 8. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a block diagram of an injection molding machine provided with the pressure detecting apparatus of the present invention (second embodiment).

DETAILED DESCRIPTION OF THE PREFERRED EMBODIMENTS

Preferred embodiments of the present invention are described below in detail by referring to the accompanying drawings.

Figure 1:
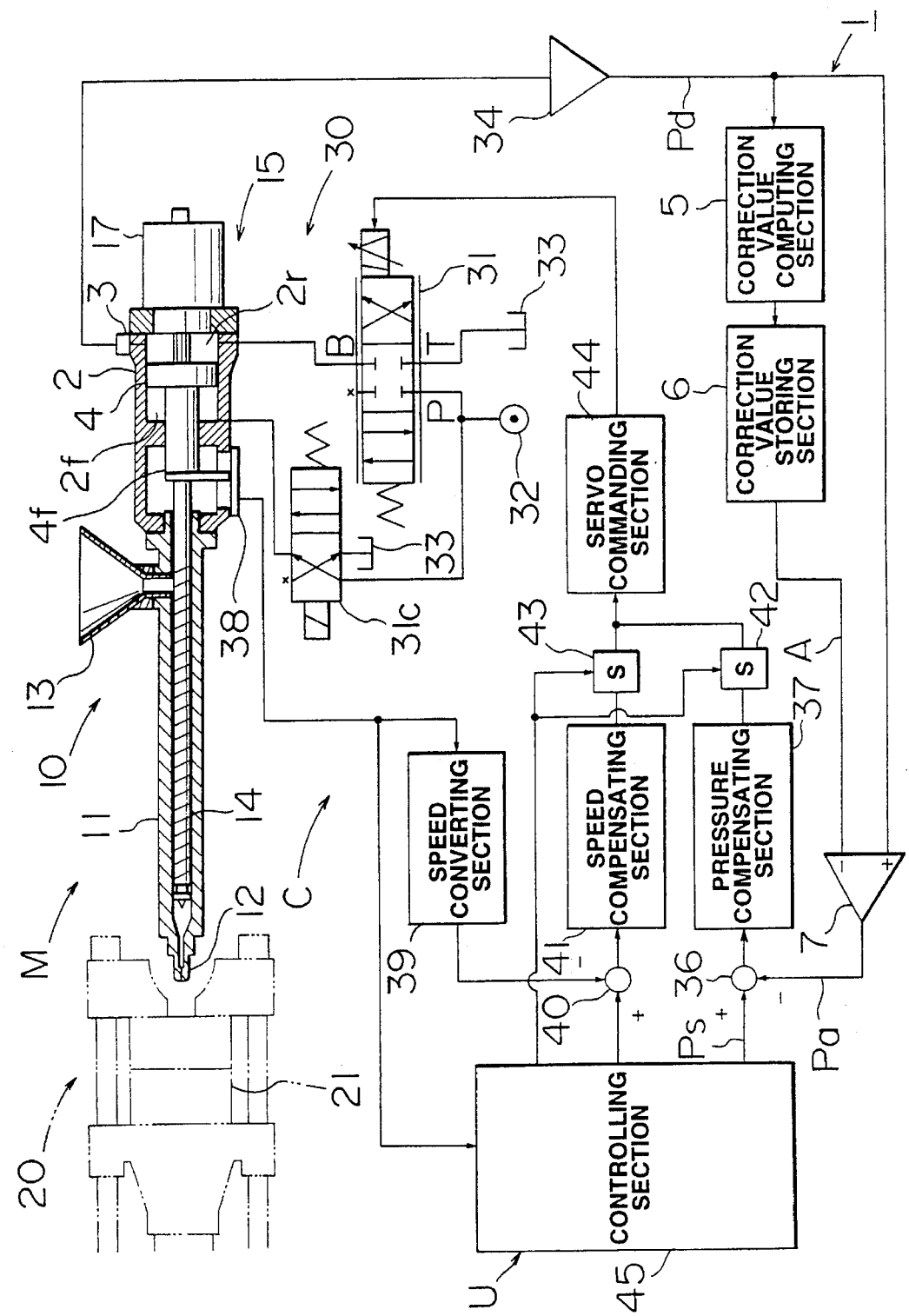
FIG. 1 is a block diagram of an injection molding machine provided with the pressure detecting apparatus of the present invention (first embodiment)

First, the constitution of an injection molding machine M including a pressure detecting apparatus 1 of the first embodiment of the present invention is described below by referring to FIG. 1.

The first embodiment shows a case in which the present invention is applied to an injection cylinder having a built-in single-rod piston.

The injection molding machine M is provided with an injection unit 10 and a clamping unit 20. The injection unit 10 is provided with a barrel cylinder 11 having an injection nozzle 12 at its front end and a hopper 13 at its rear end. A screw 14 is inserted into the barrel cylinder 11, and a screw driving section 15 is connected to the rear end of the barrel cylinder 11. The screw driving section 15 is provided with an injection cylinder (hydraulic cylinder) 2 having a built-in single-rod piston 4, a rod 4f protruded in front of the piston 4 is coupled with the rear end of the screw 14, while the shaft of an oil motor 17 fitted to the injection cylinder 2 is spline-coupled with the rear end of the piston 4. The clamping unit 20 drawn by imaginary lines supports a mold 21 to open/close the mold 21.

The injection cylinder 2 is connected to an oil-pressure control circuit C. The oil-pressure control circuit C is provided with a hydraulic circuit 30 and a control circuit U. The hydraulic circuit 30 is provided with a four-port servo valve 31 in which the port B is connected to the rear oil chamber 2r of the injection cylinder 2, the port P is connected to an oil pressure source (hydraulic pump and accumulator) 32, and the port T is connected to an oil tank 33 respectively. The front oil chamber 2f of the injection cylinder 2 is constituted so that it can selectively be connected to the oil pressure source 32 or oil tank 33 through a switching valve 31c.

Moreover, the control circuit U is provided with the pressure detecting apparatus 1 of the present invention. The pressure detecting apparatus 1 is provided with the pressure sensor 3 using a strain gauge for detecting the oil pressure of the rear oil chamber 2r of the injection cylinder 2 and a head amplifier 34 including a bridge circuit connected to the pressure sensor 3, and the output of the head amplifier 34 serves as the intended detected pressure value Pd, that is, a detected injection pressure value or a detected dwell pressure value. Moreover, the pressure detecting apparatus 1 is provided with a correction value computing section 5 having a function for obtaining the detected pressure value Pd indicating the oil pressure of the rear oil chamber 2r in the period Ts in which the detected pressure value Pd becomes zero as a correction value A, a correction value storing section 6 for storing the obtained correction value A, and a pressure correcting section 7 (differential unit) for correcting the detected pressure value Pd by the correction value A, that is, for correcting the detected pressure value Pd by adding the correction value A to or subtracting the value A from the detected pressure value Pd at the time of pressure detection.

In the control circuit U, reference numeral 36 represents a deviation detector for obtaining the deviation between the detected pressure value Pa obtained from the pressure correcting section 7 and the predetermined pressure value Ps. Reference numeral 37 represents a pressure compensating section for obtaining a pressure manipulated variable being pressure compensated with regard the deviation obtained from the deviation detector 36. Reference numeral 38 represents a position sensor for detecting the position of the screw 14. Reference numeral 39 represents a speed converting section for obtaining a speed from the position detected by the position sensor 38. Reference numeral 40 represents a deviation detector for obtaining the deviation between a detected speed obtained from the speed converting section 39 and a set speed value. Reference numeral 41 represents a speed compensating section for obtaining a speed manipulated variable being speed compensated. Reference numeral 42 and 43 represent switch functioning sections for selecting the pressure manipulated variable and the speed manipulated variable. Reference numeral 44 represents a servo commanding section for converting the pressure manipulated variable or the speed manipulated variable to a command signal for controlling the servo valve 31. Finally, reference numeral 45 represents a controlling section for performing various controls (e.g. servo sequence control and machine control).

Figure 2:
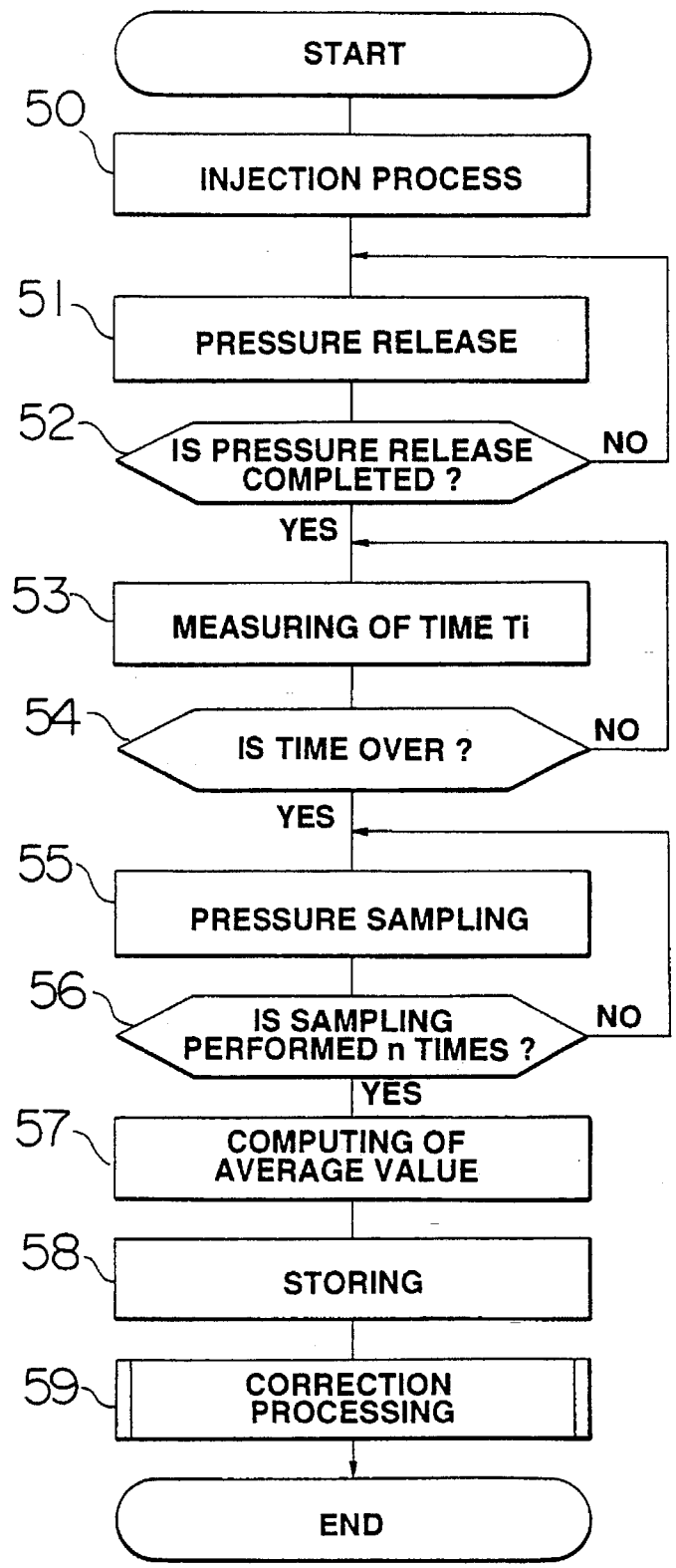
FIG. 2 is a flow chart showing the correction processing in the pressure detecting apparatus of the present invention (first embodiment)

Next, some control operations of the injection molding machine M including the operations of the pressure detecting apparatus 1 of the first embodiment are described below by referring to FIGS. 1 and 3 and further, referring to the flow chart shown in FIG. 2.

First, in the pressure detecting apparatus 1, basically, the oil pressure of the rear oil chamber 2r of the injection cylinder 2 is detected by the pressure sensor 3 and the intended detected pressure value Pd is obtained from the head amplifier 34.

However, because pressure is not controlled during the predetermined period after the injection process is completed, the predetermined period theoretically serves as the period Ts in which the detected pressure value Pd indicating the oil pressure of the rear oil chamber 2r of the injection cylinder 2 becomes zero. That is, the injection process comprises a speed control area for performing injection and filling and a pressure control area for performing pressure dwelling. After the pressure control area terminates at the point Se, the so-called pressure release is carried out. In this case, the servo valve 31 shown in FIG. 1 is switched to the left symbol, the rear oil chamber 2r of the injection cylinder 2 is connected to the oil tank 33, while the selector valve 31c is switched to the right symbol, and the front oil chamber 2f of the injection cylinder 2 is also connected to the oil tank 33 (steps 50 to 52).

Figure 3:
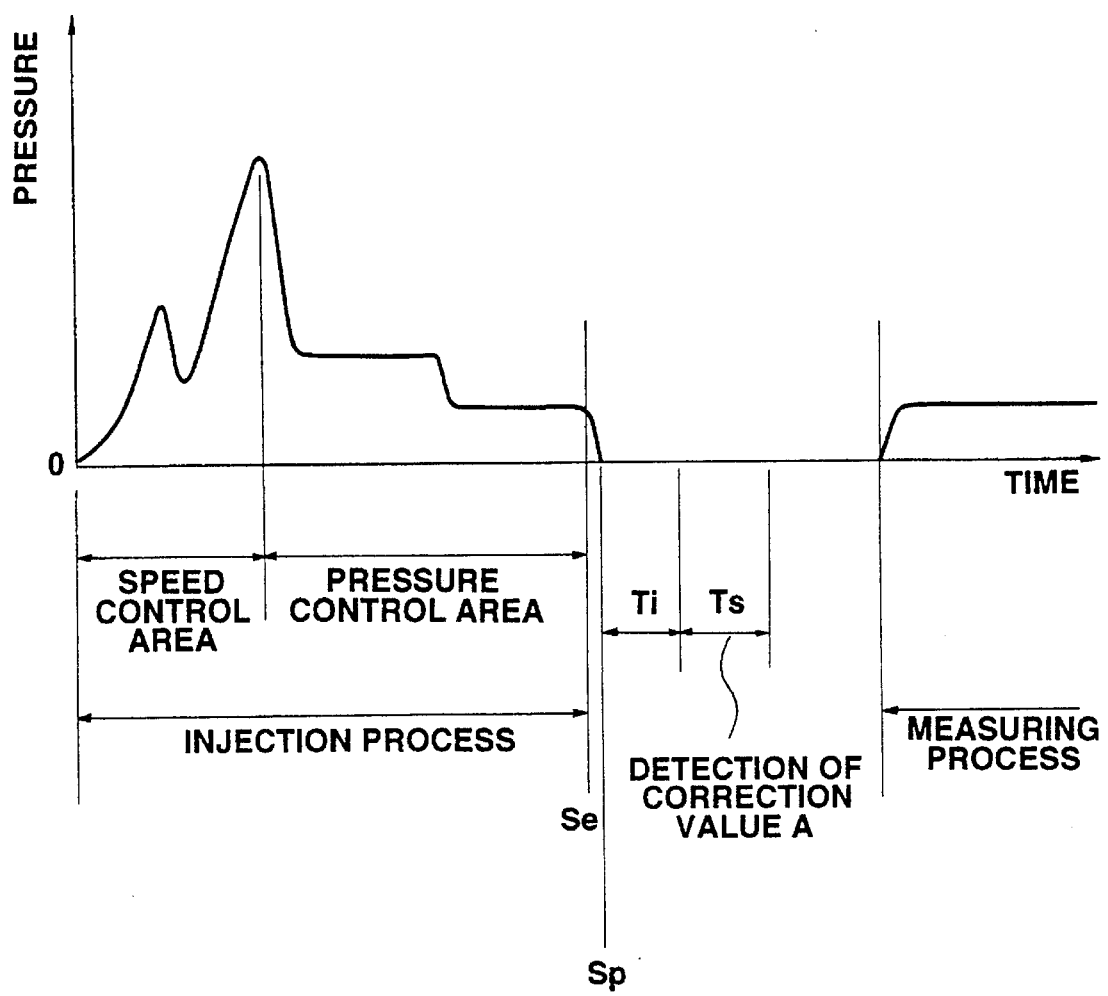
FIG. 3 is a timing chart showing a pressure change for explaining the correction processing of the pressure detecting apparatus in FIG. 2.

The controlling section 45 monitors the pressure release and, when pressure reaches the point Sp in FIG. 3 where the pressure release terminates, the controlling section 45 obtains the correction value A by the correction value computing section 5. Specifically, the timer function provided to the correction value computing section 5 measures a constant interval time Ti (step 53) and, when the time is up, the controlling section 5 performs sampling of the detected pressure value Pd obtained from the head amplifier 34 (steps 54 and 55). In this case, sampling is repeated n times with predetermined cycles. At this time, because the detected pressure value Pd to be sampled is theoretically equal to the detected pressure value Pd in the period Ts in which the detected pressure value Pd becomes zero, the detected pressure value Pd is an error caused by drift. Meanwhile, after sampling is repeated n times (step 56), the average value of each detected pressure value Pd... is computed by the correction value computing section 5 (step 57). Then, the average value is stored in the correction value storing section 6 as the correction value A (step 58).

In the next injection process for controlling pressure, the detected pressure value Pd is corrected by the stored correction value A. In this case, because pressure feedback control is performed at the time of pressure control, the detected pressure value Pd is first detected by the pressure detecting apparatus 1. That is, the oil pressure of the rear oil chamber 2r of the injection cylinder 2 is detected by the pressure sensor 3 to obtain the detected pressure value Pd. Both the obtained detected pressure value Pd and the correction value A stored in the correction value storing section 6 are sent to the pressure correcting section 7. In the pressure correcting section 7, the detected pressure value Pd is corrected by the correction value A (step 59). Specifically, the correction value A is added to or subtracted from the detected pressure value Pd and as a result the accurately-corrected detected pressure value Pa (injection pressure or dwell pressure) is obtained.

Then, the corrected detected pressure value Pa obtained from the pressure detecting apparatus 1 is sent to the deviation detector 36 and the deviation between the detected pressure value Pa and the pressure set value Ps is obtained by the deviation detector 36. The deviation is pressure-compensated by the pressure compensating section 37 and sent to the servo commanding section 44 as a pressure manipulated variable. As a result, a command signal is sent to the servo valve 31 from the servo commanding section 44 to control oil pressure while the pressure-controlled oil is supplied to the rear oil chamber 2r of the injection cylinder 2 to pressurize the screw 14. Meanwhile, because the detected pressure value Pa is obtained by the pressure detecting apparatus 1, the detected pressure value Pa and the pressure set value Ps are controlled by a pressure feedback control system so that they are made equal to each other. In this case, the switch functioning section 43 is turned off and the switch functioning section 42 is turned on by the controlling section 45.

Next, an injection molding machine Mw including the pressure detecting apparatus 1w of the second embodiment of the present invention is described below by referring to FIG. 4.

The second invention shows a case in which the present invention is applied to an injection cylinder having a built-in double-rod piston. Therefore, a portion same as that of the first embodiment is provided with the same symbol so as to make its constitution clear however its detailed description is omitted.

In FIG. 4, symbol 2w represents an injection cylinder (hydraulic cylinder) having a built-in double-rod piston 4w, a front rod 4wf of the piston 4w is coupled with the rear end of the screw 14, while a rear rod 4wr of the piston 4w is spline-coupled with the shaft of the oil motor 17 fitted to the rear end of the injection cylinder 2w. The front rod 4wf and the rear rod 4wr have the same diameter. In the case of the four-port servo valve 31 in the hydraulic circuit 30, the port A is connected to the front oil chamber 2wf of the injection cylinder 2w, the port B is connected to the rear oil chamber 2wr of the injection cylinder 2w, the port P is connected to the oil pressure source (hydraulic pump and accumulator) 32 through a logic valve (pilot-operation-type check valve) 32v, and the port T is connected to the oil tank 33, respectively.

Meanwhile, the pressure detecting apparatus 1w is provided with a front-chamber pressure detecting apparatus 1wf and a rear-chamber pressure detecting apparatus 1wr. The front-chamber pressure detecting apparatus 1wf is provided with the pressure sensor 3f having a strain gauge for detecting the oil pressure of the front oil chamber 2wf of the injection cylinder 2w and a head amplifier 34f including a bride circuit connected to the pressure sensor 3f, and the output of the head amplifier 34f serves as a detected pressure value Pdf. Moreover, the pressure detecting apparatus 1wf is provided with the correction value computing section 5f having a function for obtaining the detected pressure value Pdf indicating the oil pressure of the front oil chamber 2wf in the period Ts in which the detected pressure value Pdf theoretically becomes zero as the correction value Af and the correction value storing section 6f for storing the obtained correction value Af, and the pressure correcting section (differential unit) 7f for correcting the detected pressure value Pdf by the correction value Af, that is, for correcting the detected pressure value Pdf by adding the correction value Af to or subtracting the value Af from the detected pressure value Pdf at the time of pressure detection.

The rear-chamber pressure detecting apparatus 1wr is also constituted similarly to the front-chamber pressure detecting apparatus 1wf and is provided with the pressure sensor 3r using a strain gauge for detecting the oil pressure of the rear oil chamber 2wr of the injection cylinder 2w, a head amplifier 34r including a bridge circuit connected to the pressure sensor 3r, the correction value computing section 5r having a function for obtaining the detected pressure value Pdr indicating the oil pressure of the rear oil chamber 2wr in the period Ts in which the detected pressure value Pdr theoretically becomes zero as the correction value Ar, the correction value storing section 6r for storing the obtained correction value Ar, and the pressure correcting section (differential unit) 7r for correcting the detected pressure value Pdr by the correction value Ar, that is, for correcting the detected pressure value Pdr by adding the correction value Ar to or subtracting the value Ar from the detected pressure value Pdr. Incidentally, the output of head amplifier 34r becomes the pressure detected value Pdr.

Symbol 8 represents a difference computing section (differential unit) which is provided with a function for obtaining the difference between the corrected detected pressure value Paf which is the output of the pressure correcting section 7f and the corrected detected pressure value Par which is the output of the pressure correcting section 7r, that is, the detected pressure value Pa of the piston 4w. Moreover, the deviation detector 36 obtains the deviation between the detected pressure value Pa and the pressure set value Ps.

Therefore, according to the pressure detecting apparatus 1w of the second embodiment, the oil pressures of the front oil chamber 2wf and the rear oil chamber 2wr of the injection cylinder 2w are detected by the pressure sensors 3f and 3r respectively and after being amplified by the head amplifiers 34f and 34r, the correction values Af and Ar are obtained by the correction value computing sections 5f and 5r and stored in the correction value storing sections 6f and 6r respectively.

In the next injection process for controlling pressure, the detected pressure values Pdf and Pdr are corrected by the stored correction values Af and Ar. In this case, pressure feedback control is performed at the time of pressure control. Therefore, in a control system at the front oil chamber 2wf side, the detected pressure value Pdf is first detected through the pressure sensor 3f and the head amplifier 34f and both the obtained detected pressure value Pdf and the correction value Af stored in the correction value storing section 6f are sent to the pressure correcting section 7f where the detected pressure value Pdf is corrected by the correction value Af. On the other hand, in a control system at the rear oil chamber 2wr side, the detected pressure value Pdr is detected through the pressure sensor 3r and the head amplifier 34r and both the obtained detected pressure value Pdr and the correction value Ar stored in the correction value storing section 6r are sent to the pressure correcting section 7r where the detected pressure value Pdr is corrected by the correction value Ar. Specifically, the correction values Af and Ar are added to or subtracted from the detected pressure values Pdf and Pdr and as a result accurately-corrected detected pressure values Paf and Par are obtained.

Then, the corrected detected pressure values Paf and Par obtained from the pressure correcting sections 7f and 7r are sent to the difference computing section 8 and the detected pressure value Pa (injection pressure or dwell pressure) of the piston 4w is obtained by the difference between the detected pressure values Paf and Par.

In any of the embodiments, an allowable drift range (e.g. approx. 10% of a rated pressure) is specified for the pressure sensors 3, 3f, and 3r. Therefore, because, when the range is zero-corrected more than the specified value, a pressure sensor or malfunction is foreseen, an error processing such as operating an alarm or stopping of control operation is performed.

Embodiments of the present invention have been described above in detail. However, the present invention is not restricted to the embodiments. Though the embodiments are constituted with hardware, it is also possible to execute the same processing by software. Moreover, though a case in which the pressure of a piston of an injection cylinder is detected has been shown above, it is also possible to apply the present invention to any other hydraulic cylinder such as a clamping cylinder, etc. Moreover, the predetermined period after the injection process is completed is shown as a period in which a detected pressure value theoretically becomes zero. However, it is also possible to select the predetermined period after initialization due to power supply is completed or any other similar period. Moreover, it is possible to optionally select any frequency for obtaining a correction value, any sampling frequency, or any correction time (correction interval) by a correction value. Furthermore, it is possible to modify any detailed constitution or technique as long as it does not deviate from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pressure detecting apparatus of an injection molding machine, comprising:

a pressure sensor for detecting the oil pressure of an injection cylinder;

a correction value computing section for computing a correction value based on a detected pressure value according to an output of the pressure sensor in a predetermined period after initialization due to power supply completion or a predetermined period after an injection process is completed, each of which is a period in which the oil pressure theoretically becomes zero;

a correction value storing section for storing the correction value; and a pressure correcting section for correcting a detected pressure value by the correction value according to the output of the pressure sensor at the time of pressure detection.

2. The pressure detecting apparatus of an injection molding machine according to claim 1, wherein the correction value computing section obtains the correction value by averaging detected pressure values obtained by sampling them several times.

3. The pressure detecting apparatus of an injection molding machine according to claim 1, including a hydraulic cylinder having a built-in single-rod piston; and a pressure sensor for detecting the oil pressure of a rear oil chamber of the injection cylinder.

4. The pressure detecting apparatus of an injection molding machine according to claim 1, including a hydraulic cylinder having a built-in double-rod piston; and a pair of pressure sensors for detecting the oil pressures of front and rear oil chambers of the injection cylinder.

5. The pressure detecting apparatus of an injection molding machine according to claim 4, including a difference computing section for obtaining a detected pressure value which is acting on the double-rod piston by computing the difference between corrected detected pressure values according to outputs of each pressure sensor.

* * * * *